US010100967B2

(12) United States Patent
Bhatta et al.

(10) Patent No.: US 10,100,967 B2
(45) Date of Patent: Oct. 16, 2018

(54) TRAP COVER AND FASTENER ARRANGEMENT

(71) Applicant: Zurn Industries, LLC, Milwaukee, WI (US)

(72) Inventors: Himanshu Bhatta, Raleigh, NC (US); Zachary Henry, Holly Springs, NC (US); Jack Chuang, Chang Hua (TW)

(73) Assignee: Zurn Industries, LLC, Milwaukee, WI (US)

( * ) Notice: Subject to any disclaimer, the term of this patent is extended or adjusted under 35 U.S.C. 154(b) by 460 days.

(21) Appl. No.: 14/564,812

(22) Filed: Dec. 9, 2014

(65) Prior Publication Data

US 2016/0161043 A1    Jun. 9, 2016

(51) Int. Cl.

| F16L 59/16 | (2006.01) |
|---|---|
| F16L 59/02 | (2006.01) |
| F16L 59/22 | (2006.01) |
| F16L 57/00 | (2006.01) |
| F16B 21/07 | (2006.01) |
| E03C 1/32 | (2006.01) |
| F16B 19/00 | (2006.01) |

(52) U.S. Cl.
CPC .......... *F16L 59/168* (2013.01); *F16B 19/004* (2013.01); *F16B 21/073* (2013.01); *F16L 57/00* (2013.01); *F16L 59/022* (2013.01); *F16L 59/22* (2013.01); *E03C 2001/321* (2013.01); *Y10T 137/7036* (2015.04)

(58) Field of Classification Search
CPC ..... F16L 59/021; F16L 59/022; F16L 59/024; F16L 59/168; F16L 57/00; F16L 59/023; F16L 59/22; F16B 21/07; F16B 21/071; F16B 21/073; F16B 19/004; F16B 21/084; E03C 1/041; E03C 2001/321; Y10T 137/7036

USPC ......... 137/375; 411/512; 138/166, 167, 168; 285/45, 47, 53

See application file for complete search history.

(56) References Cited

U.S. PATENT DOCUMENTS

| 1,271,014 A * | 7/1918 | Bower ...................... F16G 9/00 |
| | | 24/31 C |
| 1,824,601 A | 9/1931 | Knight |
| 3,153,546 A | 10/1964 | Dunn |
| | (Continued) | |

FOREIGN PATENT DOCUMENTS

| CA | 1249974 | 2/1989 |
| CA | 2106177 C | 7/1997 |
| | (Continued) | |

*Primary Examiner* — Michael R Reid
*Assistant Examiner* — Jonathan Waddy
(74) *Attorney, Agent, or Firm* — Quarles & Brady LLP

(57) ABSTRACT

A cover for a pipe including a body, a slit, two flanges extending from the edges of the slit, and protrusions extending outwardly from each flange. The protrusions have three connected central openings extending from an outermost end of the protrusion to an inner surface of the flange. Also a fastener having five portions. The maximum width or diameter of the first portion, the third portion, and the fifth portion is larger than the maximum width or diameter of the second portion and the fourth portion. Also, a system for covering a pipe having such a cover and a plurality of such fasteners, a kit for covering a pipe including such a cover and at least one such fastener, and a method of covering a pipe.

9 Claims, 18 Drawing Sheets

(56) References Cited

U.S. PATENT DOCUMENTS

| | | | |
|---|---|---|---|
| 3,482,462 A * | 12/1969 | Dahlem | F16G 1/18 |
| | | | 267/167 |
| 3,966,339 A * | 6/1976 | Nemecek | F16B 12/24 |
| | | | 403/292 |
| 4,561,797 A * | 12/1985 | Aldridge | A01D 75/30 |
| | | | 172/314 |
| 5,054,513 A | 10/1991 | Trueb et al. | |
| 5,073,155 A * | 12/1991 | Mabie | F16G 11/08 |
| | | | 474/256 |
| 5,163,469 A | 11/1992 | Trueb et al. | |
| 5,259,410 A | 11/1993 | Trueb et al. | |
| 5,303,730 A | 4/1994 | Trueb et al. | |
| 5,323,554 A * | 6/1994 | MacDonald | G09F 3/005 |
| | | | 224/219 |
| 5,360,031 A | 11/1994 | Trueb et al. | |
| 5,419,364 A | 5/1995 | Trueb et al. | |
| 5,454,392 A | 10/1995 | Trueb et al. | |
| 5,524,669 A | 6/1996 | Trueb et al. | |
| 5,540,255 A | 7/1996 | Trueb et al. | |
| 5,564,463 A | 10/1996 | Helmsderfer | |
| D386,569 S | 11/1997 | Trueb et al. | |
| 5,685,328 A | 11/1997 | Helmsderfer | |
| 5,699,828 A | 12/1997 | Helmsderfer | |
| 5,701,929 A | 12/1997 | Helmsderfer | |
| D409,728 S | 5/1999 | Helmsderfer | |
| 5,901,739 A | 5/1999 | Helmsderfer | |
| 5,913,325 A | 6/1999 | Helmsderfer | |
| 5,915,412 A | 6/1999 | Helmsderfer | |
| 5,915,413 A | 6/1999 | Helmsderfer | |
| 5,934,316 A | 8/1999 | Helmsderfer | |
| 5,960,820 A | 10/1999 | Helmsderfer | |
| 6,000,420 A | 12/1999 | Nicholson et al. | |
| 6,182,706 B1 | 2/2001 | Tako et al. | |
| 6,443,497 B1 | 9/2002 | Gravison | |
| D489,435 S | 5/2004 | Trueb et al. | |
| 6,739,353 B2 | 5/2004 | Lechuga | |
| 7,032,615 B2 | 4/2006 | Trueb et al. | |
| 7,100,663 B2 | 9/2006 | Zhang et al. | |
| 7,264,431 B2 | 9/2007 | Trueb et al. | |
| 8,196,612 B2 | 6/2012 | Trueb et al. | |
| 2002/0108663 A1 | 8/2002 | Lechuga | |
| 2004/0154662 A1 * | 8/2004 | Lechuga | E03C 1/32 |
| | | | 137/375 |
| 2004/0211467 A1 | 10/2004 | Lechuga | |
| 2005/0067019 A1 * | 3/2005 | Trueb | F16B 21/082 |
| | | | 137/375 |

FOREIGN PATENT DOCUMENTS

| | | |
|---|---|---|
| CA | 2075324 C | 5/1998 |
| CA | 2158083 C | 8/1998 |
| CA | 2119427 C | 12/1998 |
| CA | 2157951 C | 11/2000 |

* cited by examiner

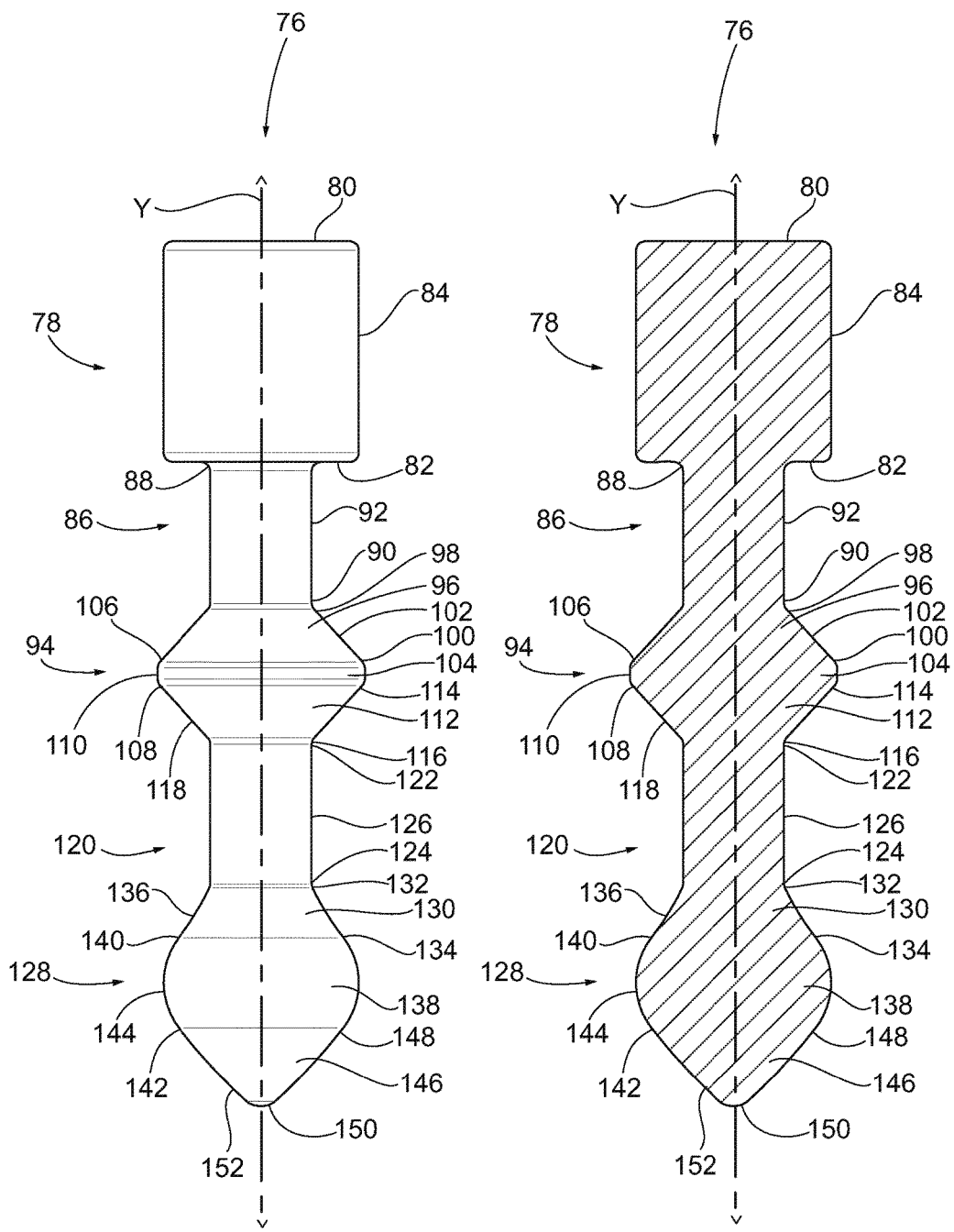

TRAP COVER AND FASTENER ARRANGEMENT

BACKGROUND OF THE INVENTION

Field of the Invention

The present invention relates to a pipe cover adapted for covering pipes under a sink and a fastener for securing the pipe cover around the pipe.

Description of Related Art

In recent years, the need and desirability of providing protective covers for pipe fixtures in plumbing installations has become well recognized. Such covers not only provide insulation to the piping, but, in public facilities protect unambulatory individuals and, particularly, wheelchair bound individuals, from contact with hot, sharp or otherwise hazardous piping when utilizing a sink with exposed piping underneath. When a wheelchair bound individual attempts to move a wheelchair close to a sink, that individual suffers the risk of being sufficiently close to the piping under the sink that his or her knees or lower legs can come into contact with the piping. Such contact can result in cuts, scrapes, burns, and other injuries. For this reason, the Americans with Disabilities Act (ADA) Accessibility Guidelines (ADAAG) requires that "[w]ater supply and drain pipes under lavatories and sinks shall be insulated or otherwise configured to protect against contact. There shall be no sharp or abrasive surfaces under lavatories and sinks." (ADAAG § 4.19.4).

There are several U.S. patents which disclose protective covers for under-sink piping including U.S. Pat. Nos. 7,100,663 and 6,739,353.

U.S. Pat. No. 7,100,663, which is hereby incorporated by reference as if set forth in its entirety herein, is directed to a unitary pipe cover assembly for disposition about a pipe configuration under a sink. The unitary pipe cover is sized and shaped to cover the P-trap and the waste arm of the under-sink pipe configuration. The cover assembly can be configured to cover the under-sink pipe configuration when the waste arm extends at an acute angle with respect to the J-trap. The pipe cover includes a longitudinal slit by which the pipe cover can be spread open and placed around the pipes. The pipe cover is then connected around the pipe using two-headed locking pins placed through apertures in the pipe cover on opposing sides of the slit.

U.S. Pat. No. 6,739,353, which is hereby incorporated by reference as if set forth in its entirety herein, is directed to a multi-section protective cover system for water pipes that includes a plurality of jackets capable of being disposed about the pipes under a conventional sink. The jackets include longitudinal slits so that they may be fitted onto the pipes with a locking system provided to fasten the jackets about the pipes. The locking system may be a Velcro-type system that is placed on opposing sides of inwardly facing flanges on both sides of the slit, may be a two-headed locking pin placed through apertures in the pipe cover on opposing sides of the slit, or may be a cable tie placed through apertures in the pipe cover on opposing sides of the slit. The jackets may also include ribs or protrusions extending between the interior surfaces of the jackets and the pipes in order to provide an insulative space between the jackets and the pipes.

SUMMARY OF THE INVENTION

The present invention is directed to a cover for a pipe. The cover has a body shaped to correspond to the shape of at least a portion of the pipe that is to be covered. A longitudinal slit extends along at least a portion of the body. A first flange extends outwardly from one edge of the slit and a second flange extends outwardly from a second edge of the slit, and protrusions extend outwardly from the outer surface of each flange. The protrusions have three central openings—a first central opening having a first open end and a second open end, a second central opening having a first open end and a second open end, and a third central opening having a first open end and a second open end. The first open end of the first central opening is at an outermost end of the protrusion and the second open end of the first central opening is connected to the first open end of the second central opening. The second open end of the second central opening is connected to the first open end of the third central opening. The second open end of the third central opening is located on an inner surface of the flange.

Each protrusion on the first flange is aligned with a protrusion on the second flange such that, when the first flange and the second flange are brought together, the third central openings of the protrusions align to form a single cavity. The second central opening may extend through the innermost end of the protrusion and into the flange, and the third central opening may extend through the flange.

The maximum diameter or width of the first central opening as viewed in cross-section in a plane perpendicular to the central longitudinal axis of the protrusion and a maximum diameter or width of the third central opening as viewed in cross-section in a plane perpendicular to the central longitudinal axis of the protrusion may be larger than a maximum diameter or width of the second central opening as viewed in cross-section in a plane perpendicular to the central longitudinal axis of the protrusion. Also, the first central opening may have a maximum diameter or width as viewed in cross-section in a plane perpendicular to the central longitudinal axis of the protrusion equal to a maximum diameter or width of the third central opening as viewed in cross-section in a plane perpendicular to the central longitudinal axis of the protrusion. The cross-section of the first central opening, the second central opening, and the third central opening may be a circle or a square.

The second central opening may be deformable.

The invention is also directed to a fastener. The fastener has five portions. The first portion has a first end, a second end, and a sidewall extending therebetween. The second portion has a first end, a second end, and a sidewall extending therebetween. The first end of the second portion is connected to the second end of the first portion. The third portion has a first end and a second end. The first end of the third portion is connected to the second end of the second portion. The fourth portion has a first end, a second end, and a sidewall extending therebetween. The first end of the fourth portion is connected to the second end of the third portion. The fifth portion has a first end and a second end. The first end of the fifth portion is connected to the second end of the fourth portion.

The maximum width or diameter of the first portion, the third portion, and the fifth portion as viewed in cross-section in a plane perpendicular to the central longitudinal axis of the fastener is larger than the maximum width or diameter of the second portion and the fourth portion as viewed in cross-section in a plane perpendicular to the central longitudinal axis of the fastener.

The third portion of the fastener may have three sections. The first section may have a first end, a second end, and a radially outward sloping sidewall. The second section may have a first end a second end, and a cylindrical sidewall. The third section may have a first end, a second end, and a radially inward sloping sidewall. The first end on the first section may be connected to the second end of the second portion. The second end of the first section may be connected to the first end of the second section. The second end of the second section may be connected to the first end of the third section. And, the second end of the third section may be connected to the first end of the fourth portion. The first section and the third section may be mirror images attached to opposite sides of the second section.

The fifth portion of the fastener may also have three sections. The first section may have a first end, a second end, and a radially outward sloping sidewall. The second section may have a first end a second end, and a rounded sidewall. The third section may have a first end, a second end, and a radially inward sloping sidewall that comes to a point. The first end of the first section may be connected to the second end of the fourth portion. The second end of the first section may be connected to the first end of the second section. And, the second end of the second section may be connected to the first end of the third section. The maximum width or diameter of the second section as viewed in cross-section in a plane perpendicular to the central longitudinal axis of the fastener is larger than a maximum width or diameter of the first section or the second section as viewed in cross-section in a plane perpendicular to the central longitudinal axis of the fastener. The first portion, the second portion, and the fourth portion may be cylindrical.

The present invention is also directed to a system for covering a pipe having a cover as described above and a plurality of fasteners, at least one of which is described above.

The present invention is also directed to a kit for covering a pipe including a cover and at least one fastener as described above, where the fastener is used to secure the cover around the pipe.

The present invention is also directed to a method of covering a pipe. A cover and at least one fastener as described above are provided. The first portion of the fastener is located in the first central opening of a first protrusion on the first flange of the cover and the second portion of the fastener is located in the second central opening of the first protrusion on the first flange of the cover. The cover is placed around the pipe and opposing forces are applied to the first portion on the first flange and an opposing second protrusion on the second flange to force the fifth portion of the fastener into the first central opening of the second protrusion. The first portion of the fastener may be located in the first central opening of a first protrusion on the first flange and the second portion of the fastener may be located in the second central opening of the first protrusion on the first flange by inserting the fifth portion of the fastener into the first central opening of a first protrusion on the first flange, applying force to the first portion of the fastener to force the fifth portion of the fastener through the second central opening of the first protrusion, and applying further force to the first portion of the fastener to force the third portion of the fastener through the second central opening of the first protrusion.

The present invention is also directed to a cover for a pipe having a body with a shape that substantially corresponds to the shape of at least a portion of the pipe to be covered and a drain. The drain includes a central opening extending through the thickness of the body and surrounded by a groove. At least a portion of the groove extends completely through the thickness of the body and at least a portion of the groove extends partially through the thickness of the body. The central opening, the groove, or both may be circular and the portions extending through the thickness of the groove may be curved.

Further details and advantages of the invention will become clear upon reading the following detailed description in conjunction with the accompanying drawing figures, wherein like parts are designated with like reference numerals throughout.

BRIEF DESCRIPTION OF THE DRAWING(S)

FIG. 7 is a side elevational view of the fastener of FIG. 6;

FIG. 8 is a cross-sectional view of the fastener of FIG. 6;

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
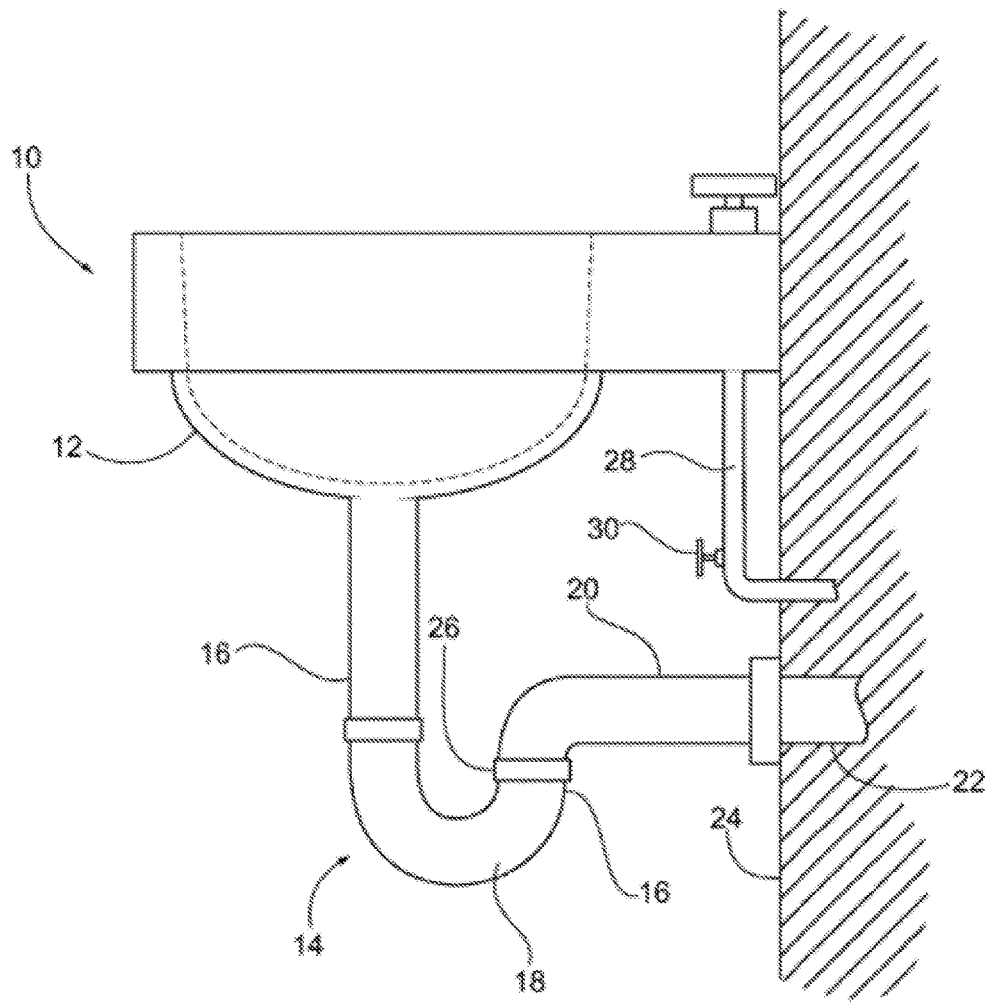
FIG. 1 is a side elevational view of a conventional sink and the associated piping used therewith.

As shown in FIG. 1, the conventional sink structure comprises a sink 10 having a basin 12, which is capable of allowing water to drain through a P-trap 14, having a pair of vertically spaced apart legs 16 connected by a U-shaped bend 18. Connected to the P-trap is an L-shaped waste arm 20, leading to a drain pipe 22, which is located within the wall 24. A nut 26 is provided for securing the waste arm 20 to the P-trap 14. Also located beneath the basin are the supply pipes 28 for the hot and cold water each of which includes a shut-off valve 30.

Figure 2:
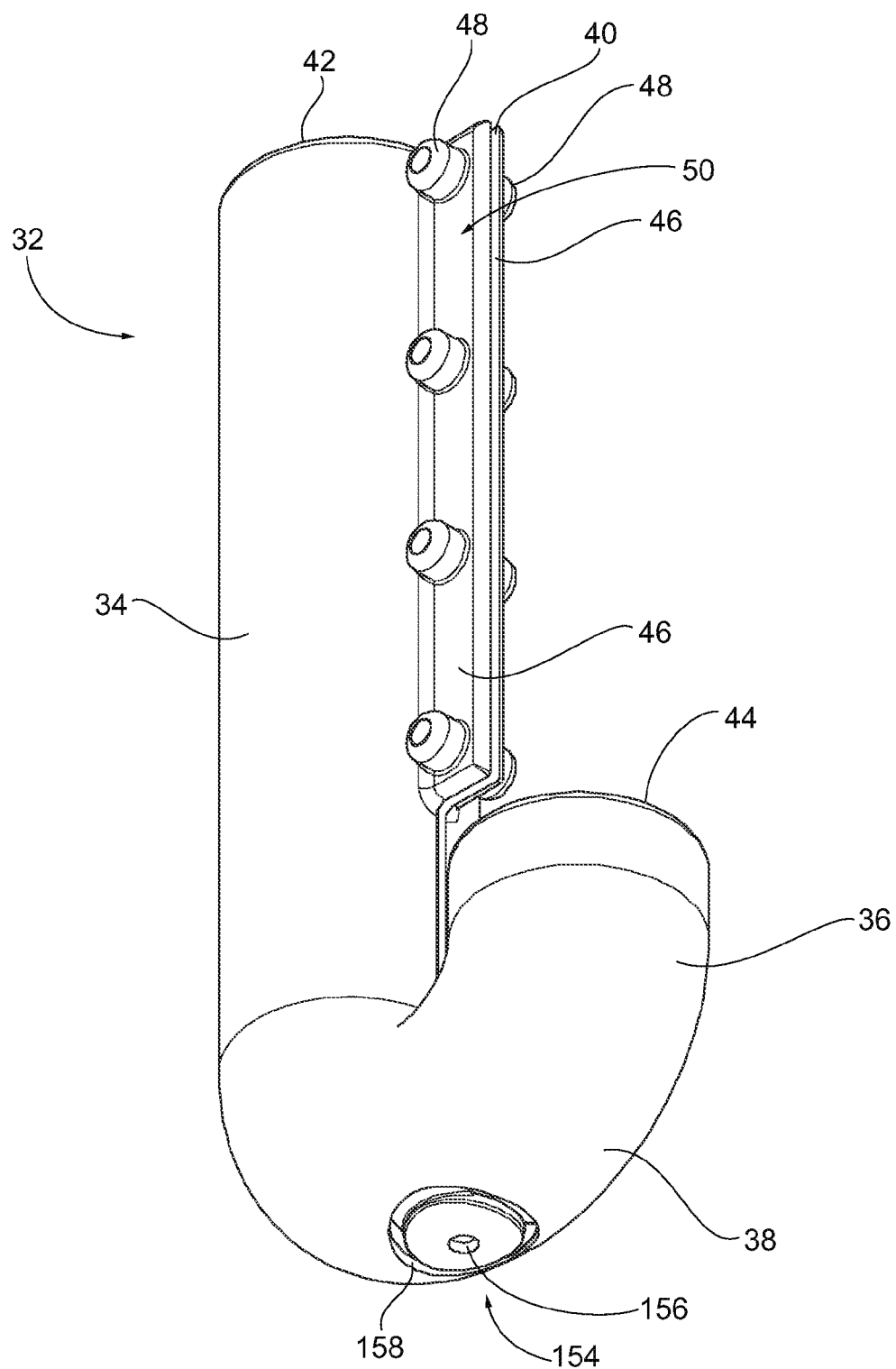
FIG. 2 is a lower perspective view of a one embodiment of a pipe cover according to the present invention.
Figure 3:
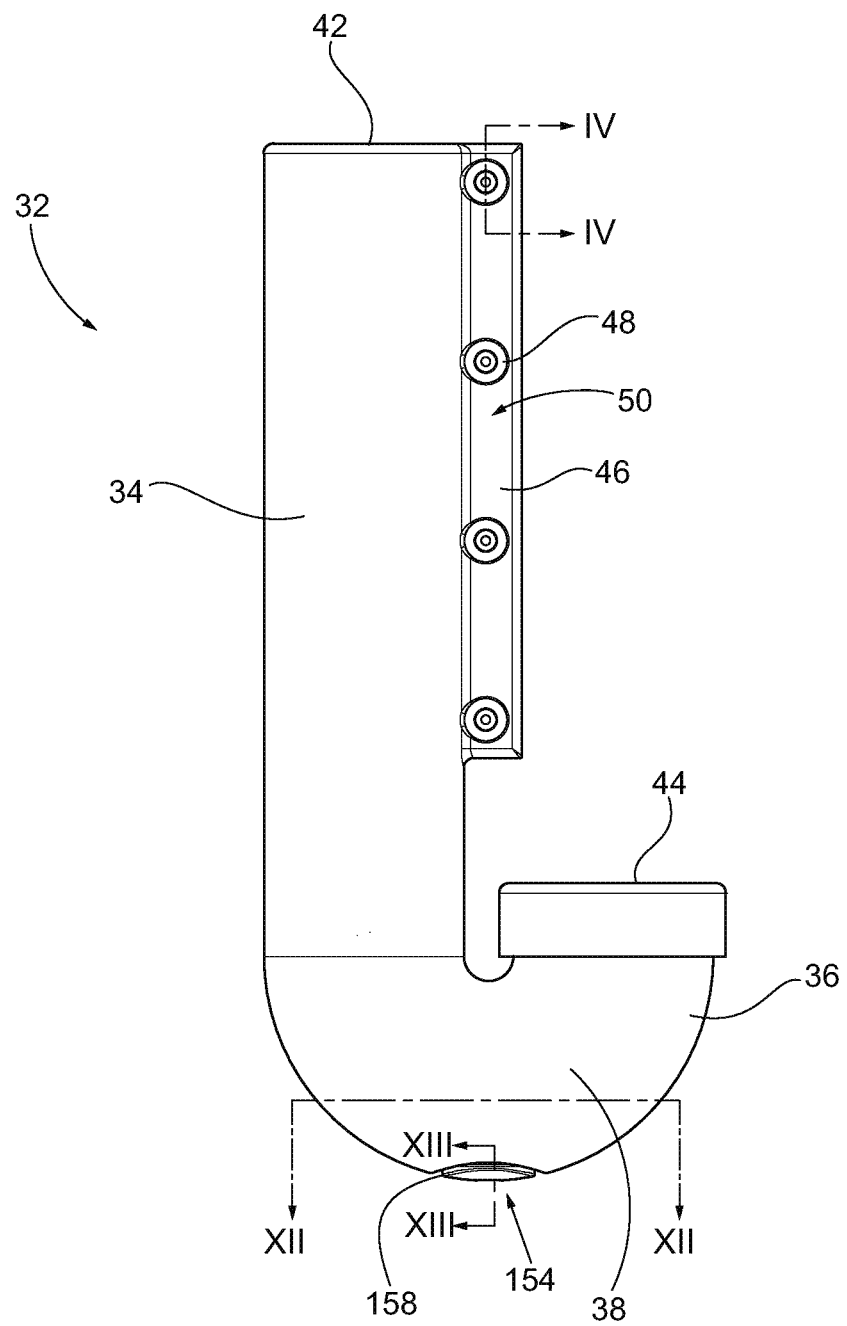
FIG. 3 is a side elevational view of the pipe cover of FIG. 2.

FIGS. 2 and 3 show a cover 32 according to the present invention for covering the P-trap 14. The shape of the cover 32 substantially corresponds to the shape of the P-trap having a longer, generally cylindrical leg 34 attached to a shorter, generally cylindrical leg 36 by a U-shaped bend 38. A longitudinal slit 40 extends from the top 42 of the longer leg 34 down its sidewall around the inside portion of the U-shaped bend 38 and up the sidewall of the shorter leg 36 to the top 44 of the shorter leg 36. This slit allows the flexible material of the cover 32 to be spread apart and fitted on the P-trap pipe.

The interior of the longer leg 34 may include inwardly extending flanges 41. The flanges 41 may take any suitable size shape and number as long as they act as a spacer between the cover 32 and the pipe.

An outwardly extending flange 46 is located on each edge of the slit 40 along a portion of the longer leg 34. The flanges 46 extend along the sidewall of the longer leg 34 from the top 42 of the longer leg 34 to a distance above the top 44 of the shorter leg 36. A plurality of protrusions 48 extend outwardly from the outer surface 50 of each flange. The protrusions 48 are spaced apart from one another, and each protrusion 48 on one flange 46 is aligned with a protrusion 48 on the other flange 46.

Figure 4:
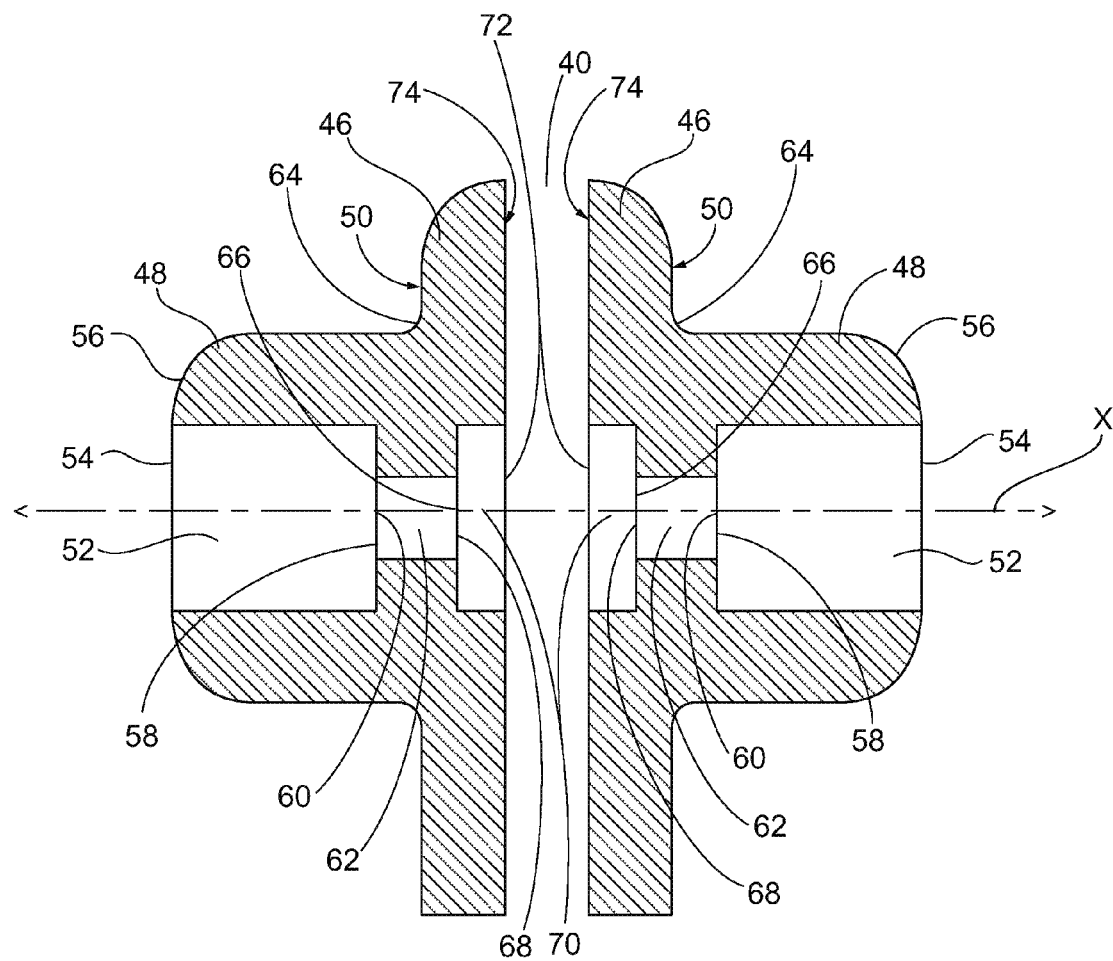
FIG. 4 is a cross-section view along line IV-IV in FIG. 3.
Figure 5:
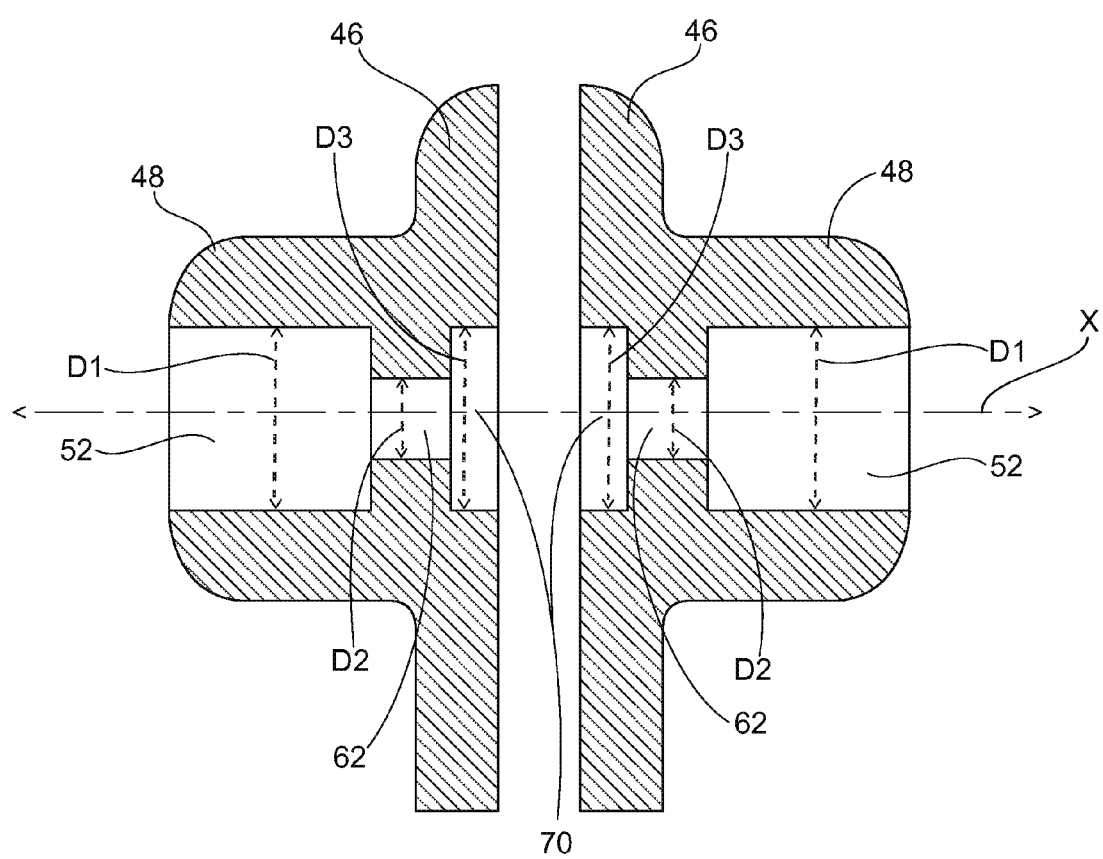
FIG. 5 is a cross-section view along line IV-IV in FIG. 3.

As shown in FIGS. 4 and 5, each protrusion 48 has a first central opening 52 having a first open end 54 at the outermost end 56 of the protrusion 48 and a second open end 58 connected to a first open end 60 of a second central opening 62. The second central opening 62 extends through the innermost end 64 of the protrusion 48 and into the flange 46. The second open end 66 of the second central opening 62 is connected to the first open end 68 of a third central opening 70 that extends through the flange 46 such that the second open end 72 of the third central opening 70 is located on the inner surface 74 of the flange 46.

The first central opening 52, second central opening 62, and third central opening 70 may take any suitable size and shape for accommodating the fastener 76 which will be described later, including but not limited to openings having a circular (as shown in FIGS. 2-5) or square cross-section as viewed in a plane perpendicular to the central longitudinal axis X of the protrusion 48. Depending on the shape of the first central opening 52, second central opening 62, and third central opening 70, the maximum diameter or width D1 of the first central opening 52 as viewed in cross-section in a plane perpendicular to the central longitudinal axis X of the protrusion 48 and the maximum diameter or width D3 of the third central opening 70 as viewed in cross-section in a plane perpendicular to the central longitudinal axis X of the protrusion 48 is larger than the maximum diameter or width D2 of the second central opening 62 as viewed in cross-section in a plane perpendicular to the central longitudinal axis X of the protrusion 48. The first central opening 52 may have a maximum diameter or width D1 as viewed in cross-section in a plane perpendicular to the central longitudinal axis X of the protrusion 48 equal to the maximum diameter or width D3 of the third central opening 70 as viewed in cross-section in a plane perpendicular to the central longitudinal axis X of the protrusion 48 as shown in FIGS. 4 and 5.

FIGS. 6-9 show a fastener 76 that is used to secure the cover 32 around the P-trap 14. The fastener 76 has five portions.

The first portion 78 may take any suitable shape or size as long as it can be accommodated in the first central opening 52 of the protrusion 48 and cannot pass into the second central opening 62 without deformation of the second central opening 62. Such shapes include, but are not limited to, shapes having a circular or square cross-section as viewed in a plane perpendicular to the central longitudinal axis Y of the fastener 76. As shown in FIGS. 6-9, the first portion 78 of the fastener 76 has a first end 80, a second end 82, and a generally cylindrical sidewall 84 extending therebetween.

The second portion 86 may take any suitable shape or size as long as it can be accommodated in the second central opening 62 of the protrusion 48. Such shapes include, but are not limited to, shapes having a circular or square cross-section as viewed in a plane perpendicular to the central longitudinal axis Y of the fastener 76. As shown in FIGS. 6-9, the second portion 86 of the fastener 76 may have a first end 88, a second end 90, and a generally cylindrical sidewall 92 extending therebetween. The first end 88 of the second portion 86 of the fastener 76 is connected to the second end 82 of the first portion 78 of the fastener 76. As with the first central opening 52 and the second central opening 62 of the protrusion 46, the first portion 78 of the fastener 76 has a maximum diameter or width d1 as viewed in cross-section in a plane perpendicular to the central longitudinal axis Y of the fastener 76 that is greater than the maximum diameter or width d2 of the second portion 86 as viewed in cross-section in a plane perpendicular to the central longitudinal axis Y of the fastener 76.

The third portion 94 may take any suitable shape or size as long as it can be accommodated in the combination of the third central opening 70 of one protrusion 48 and the third central opening 70 of the opposing protrusion 48 when the flanges 46 are mated and, when the second central opening 62 is deformed, can pass through the second central opening 62. Such shapes include, but are not limited to, shapes having a circular or square cross-section as viewed in a plane perpendicular to the central longitudinal axis Y of the fastener 76. As shown in FIGS. 6-9, the third portion 94 of the fastener 76 has three sections.

The first section 96 is attached to the second end 90 of the second portion 86 of the fastener 76. The first end 98 of the first section 96 has a maximum width or diameter as viewed in cross-section in a plane perpendicular to the central longitudinal axis Y of the fastener 76 that is smaller than the maximum width or diameter of the second end 100 of the first section 96 as viewed in cross-section in a plane perpendicular to the central longitudinal axis Y of the fastener 76 and a radially outward sloping sidewall 102 extending from the first end 98 to the second end 100.

The second section 104 has a first end 106, a second end 108, and a generally cylindrical sidewall 110 with a width or diameter d3 as viewed in cross-section in a plane perpendicular to the central longitudinal axis Y of the fastener 76 substantially equal to the width or diameter of the second end 100 of the first section 96 as viewed in cross-section in a plane perpendicular to the central longitudinal axis Y of the fastener 76.

The third section 112 has a first end 114 and a second end 116 where the width or diameter of the first end 114 as viewed in cross-section in a plane perpendicular to the central longitudinal axis Y of the fastener 76 is larger than the width or diameter of the second end 116 as viewed in cross-section in a plane perpendicular to the central longitudinal axis Y of the fastener 76. A radially inwardly sloping sidewall 118 extends from the first end 114 to the second end 116. The first end 114 of the third section 112 is connected to the second end 108 of the second section 104 and has a width or diameter as viewed in cross-section in a plane perpendicular to the central longitudinal axis Y of the fastener 76 that is substantially equal to the width or diameter d2 of the second end 108 of the second section 104 as viewed in cross-section in a plane perpendicular to the central longitudinal axis Y of the fastener 76. The first section 96 and third section 112 are generally mirror images attached to opposite sides of the second section 104.

Figure 6:
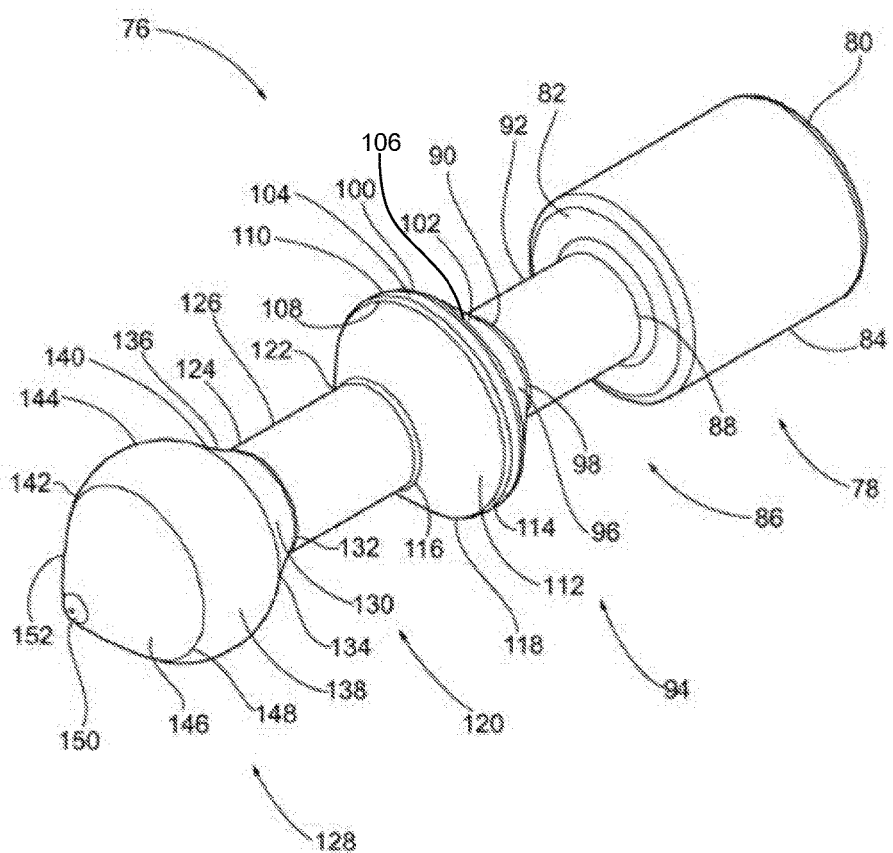
FIG. 6 is a side perspective view of one embodiment of a fastener according the present invention.
Figure 9:
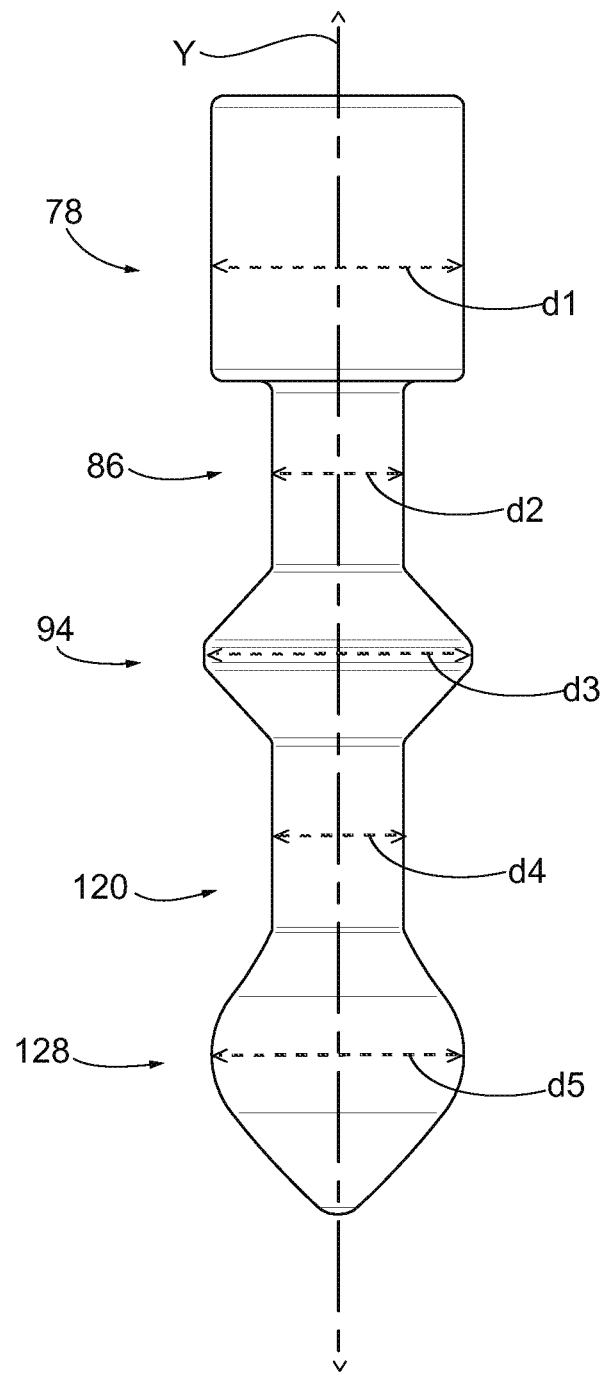
FIG. 9 is a side elevational view of the fastener of FIG. 6.

The fourth portion 120 may take any suitable shape or size as long as it can be accommodated in the second central opening 62 of the protrusion 48. Such shapes include, but are not limited to, shapes having a circular or square cross-section as viewed in a plane perpendicular to the central longitudinal axis Y of the fastener 76. As shown in FIGS. 4-6, the fourth portion 120 of the fastener 76 may have a first end 122, a second end 124, and a generally cylindrical sidewall 126 extending therebetween. The first end 122 of the fourth portion 120 of the fastener 76 is connected to the second end 116 of the third section 112 of the third portion 94 of the fastener 76.

The fifth portion 128 may take any suitable shape or size as long as it can be accommodated in the first central opening 52 of the protrusion 48 and, when the second central opening 62 is deformed, can pass through the second central opening 62. Such shapes include, but are not limited to, shapes having a circular or square cross-section as viewed in a plane perpendicular to the central longitudinal axis Y of the fastener 76. As shown in FIGS. 6-9, the fifth portion 128 of the fastener 76 has three sections.

The first section 130 is attached to the second end 124 of the fourth portion 120 of the fastener 76. The first end 132 of the first section 130 has a width or diameter that is smaller as viewed in cross-section in a plane perpendicular to the central longitudinal axis Y of the fastener 76 than the width or diameter of the second end 134 of the first section 130 as viewed in cross-section in a plane perpendicular to the central longitudinal axis Y of the fastener 76 and a radially outwardly sloping sidewall 136 extending from the first end 132 to the second end 134.

The second section 138 has a first end 140, a second end 142, and a generally convex rounded sidewall 144. The width or diameter of the first end 140 and the second end 142 as viewed in cross-section in a plane perpendicular to the central longitudinal axis Y of the fastener 76 are substantially equal to the width or diameter of the second end 134 of the first section 130 as viewed in cross-section in a plane perpendicular to the central longitudinal axis Y of the fastener 76. The sidewall 146 of the second section 138 is convexly rounded such that the maximum width or diameter d5 of the second section 138 as viewed in cross-section in a plane perpendicular to the central longitudinal axis Y of the fastener 76 is located at the midpoint between the first end 140 and the second end 142 of the second section 138.

The third section 146 is generally cone-shaped and has a first end 148 with a width or diameter as viewed in cross-section in a plane perpendicular to the central longitudinal axis Y of the fastener 76 substantially equal to the width or diameter of the second end 142 of the second section 138 as viewed in cross-section in a plane perpendicular to the central longitudinal axis Y of the fastener 76 to which it is attached. A radially inwardly sloping sidewall 148 extends from the first end 148 to a second end 150 which is substantially pointed.

As with the first central opening 52 and the second central opening 62 of the protrusion 46, the fourth portion 120 of the fastener 76 has a maximum width or diameter d4 as viewed in cross-section in a plane perpendicular to the central longitudinal axis Y of the fastener 76 that is less than the maximum width or diameter d5 of the fifth portion 128 as viewed in cross-section in a plane perpendicular to the central longitudinal axis Y of the fastener 76.

The fastener 76 may be used in two ways to attach the flanges 46 to one another and seal the slit 40. In a first embodiment, the fastener 76 is preassembled with the cover 32. The first portion 78 of the fastener 76 is located in the first central opening 52 of a protrusion 48 on one of the flanges 46, the second portion 86 of the fastener 76 is located in the second central opening 62 of the protrusion 48, and at least a portion of the third portion 94 of the fastener 76 is located in the third central opening 70 of the protrusion 48. The third portion 94 of the fastener 76 keeps the fastener 76 from falling out of the protrusion 48 when it abuts the second open end 66 of the second central opening 62.

Figure 10:
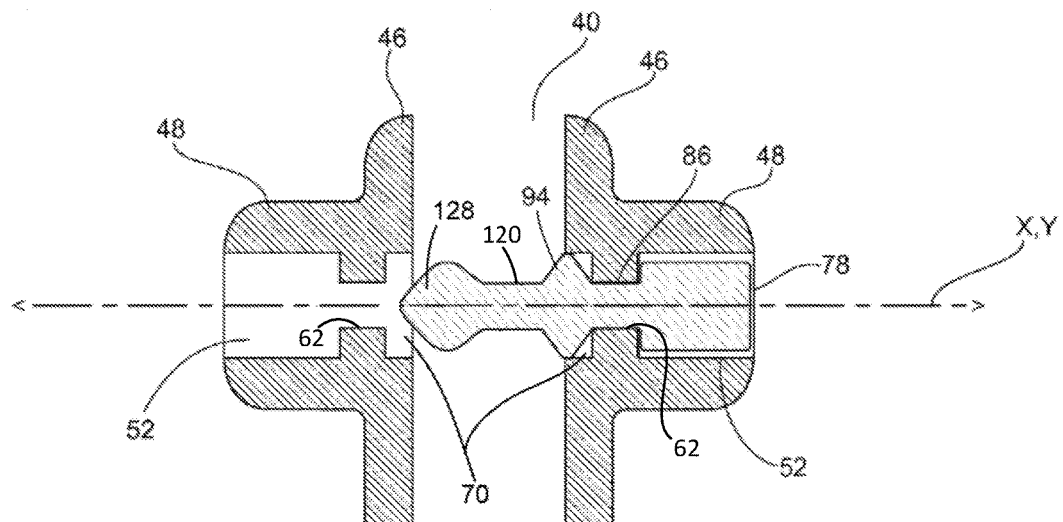
FIG. 10 is a cross-section view along line IV-IV in FIG. 3 with the fastener of FIG. 6 partially inserted.
Figure 11:
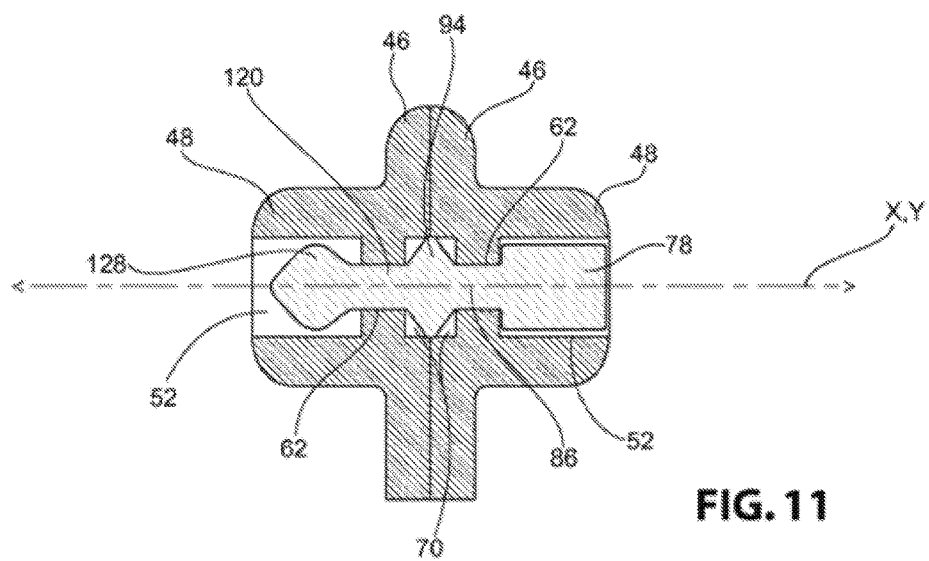
FIG. 11 is a cross-section view along line IV-IV in FIG. 3 with the fastener of FIG. 6 fully inserted.
Figure 12:
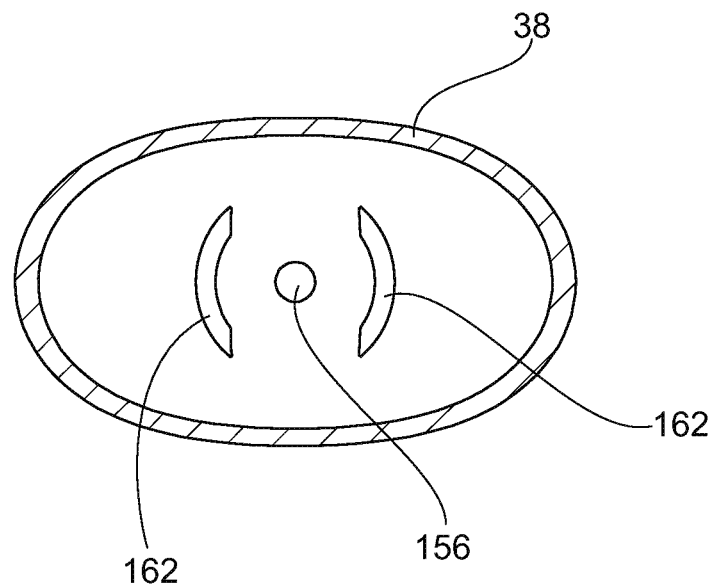
FIG. 12 is a cross-section view along line XII-XII in FIG. 3.
Figure 13:
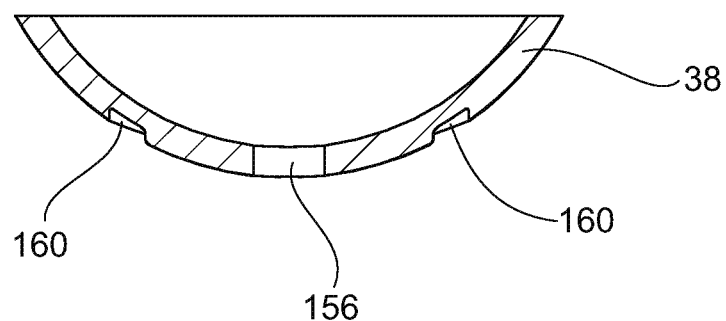
FIG. 13 is a cross-section view along line XIII-XIII in FIG. 3.
Figure 14:
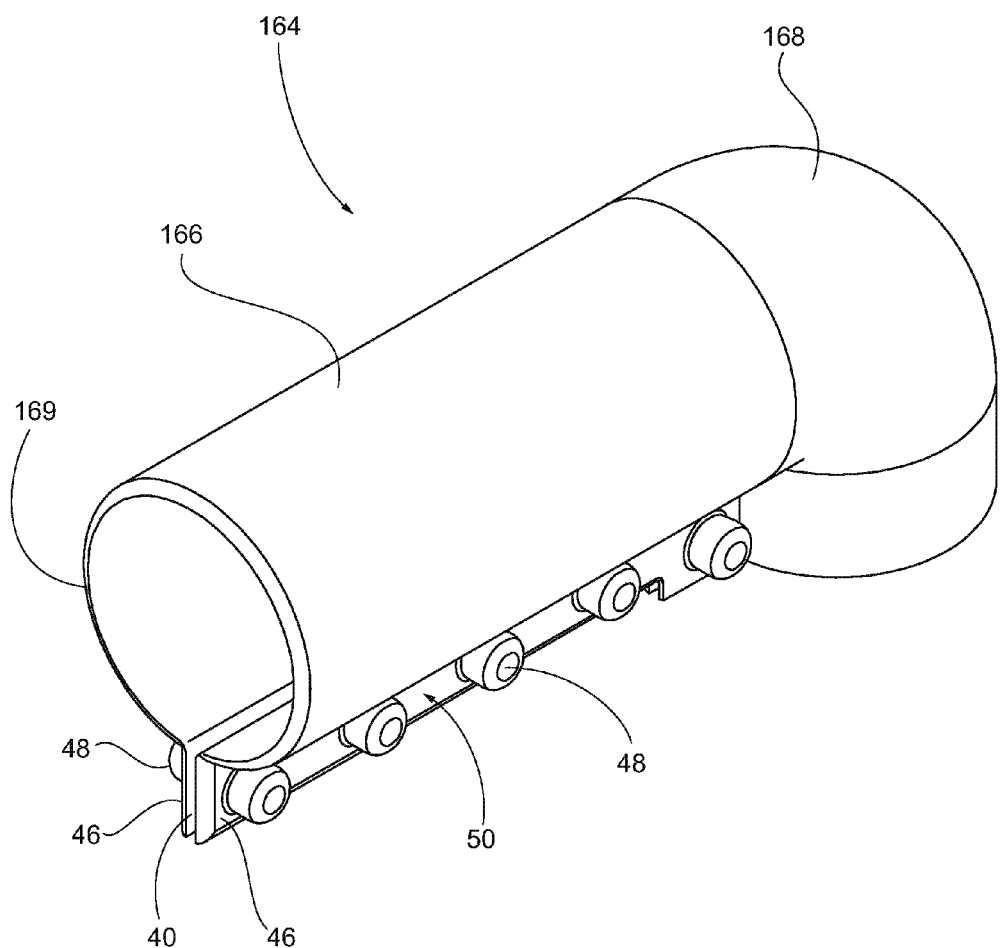
FIG. 14 is a side perspective view of a second embodiment of a pipe cover according to the present invention.
Figure 15:
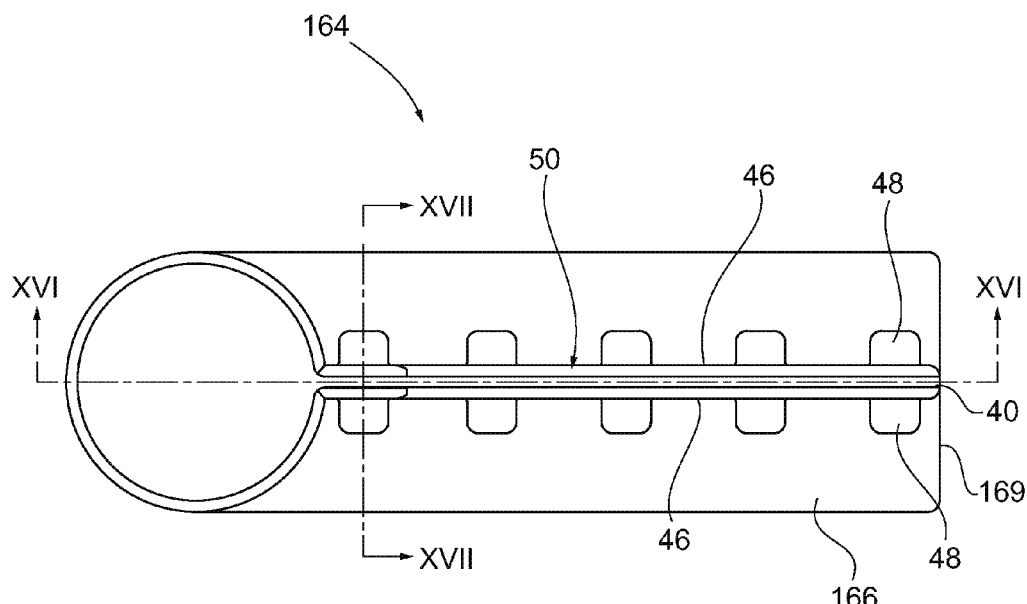
FIG. 15 is a bottom elevation view of the pipe cover of FIG. 14.
Figure 16:
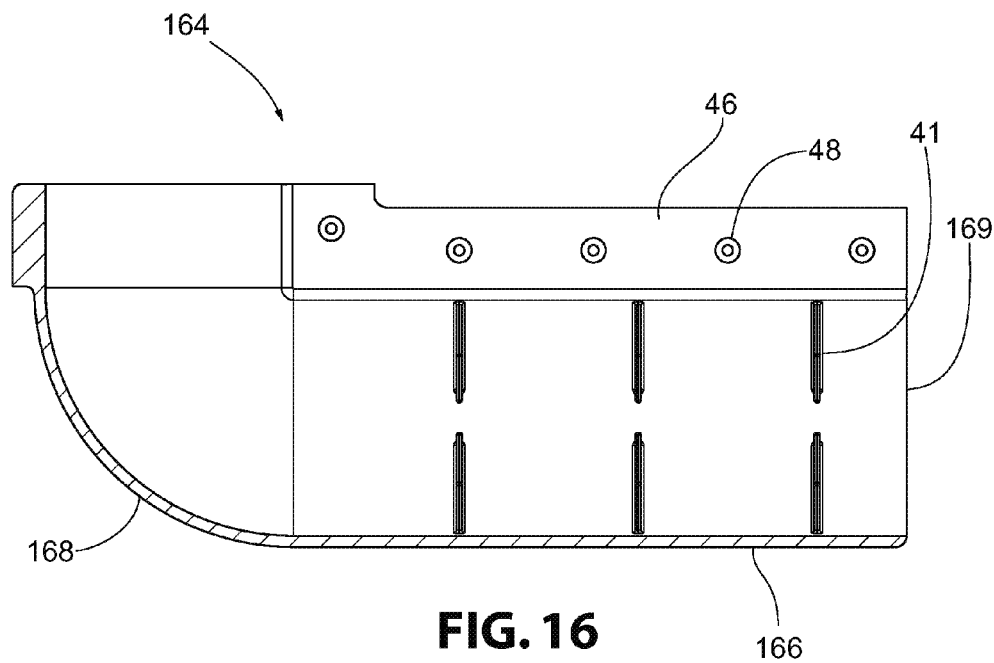
FIG. 16 is a cross-section view along line XVI-XVI in FIG. 15.

As shown in FIGS. 10 and 11, after the cover 32 is placed around the P-trap 14, the fifth portion 128 of the fastener 76 is inserted into the third central opening 70 of the corresponding protrusion 48 on the opposing flange 46. By applying opposing forces to the outermost ends 56 of the protrusions 48, the flanges 46 are snapped together when the fifth portion 128 of the fastener 76 enters the first central opening 52 of the opposing flange 46. The cone-shaped third section 146 of the fifth portion 128 of the fastener 76 acts to force open the second central opening 62 of the protrusion 48 allowing the fifth portion 128 of the fastener 76 to pass through. Once the fifth portion 128 of the fastener 76 has passed through the second central opening 62 of the protrusion 48 and is no longer applying force to the second central opening 62, the second central opening 62 returns to its original configuration around the fourth portion 120 of the fastener 76.

Alternatively, the fastener 76 could be supplied separately from the cover 32. After the cover 32 is placed around the P-trap 14, the fifth portion 128 of the fastener 76 is inserted into the first central opening 52 of a protrusion 48 on one of the flanges 46. When force is applied to the first end 80 of the first portion 78 of the fastener 76, the cone-shaped third section 146 of the fifth portion 128 of the fastener 76 acts to force open the second central opening 62 of the protrusion 48 allowing the fifth portion 128 of the fastener 76 to pass through. Once the fifth portion 128 of the fastener 76 has passed through the second central opening 62 of the protrusion 48 and is no longer applying force to the second central opening 62, the second central opening 62 returns to its original configuration around the fourth portion 120 of the fastener 76. As further force is applied to the first end 80 of the first portion 78 of the fastener 76, the third section 112 of the third portion 94 of the fastener 76 acts to force open the second central opening 62 of the protrusion 48 allowing the third portion 94 of the fastener 76 to pass through. Once the third portion 94 of the fastener 76 has passed through the second central opening 62 of the protrusion 48 and is no longer applying force to the second central opening 62, the second central opening 62 returns to its original configuration around the second portion 86 of the fastener 76. The flanges 46 can then be snapped together by applying opposing forces to the outermost ends 56 of the opposing protrusions 48 as described above.

As shown in FIGS. 2, 3, 12, and 13, the cover 32 includes a drain 154 in the bottom of the U-shaped bend 38 to allow condensate to drain from the cover 32. The drain 154 includes a central drain hole 156 surrounded by a groove 158. The drain hole 156 may take any suitable shape including, but not limited to, circular, square, and polygonal. The groove 158 may take any suitable shape including, but not limited to, circular, square, and polygonal, and may correspond to the shape of the drain hole 156. The groove 158 includes sections 160 that only extend partially through the sidewall of the U-shaped bend 38 and sections 162 that extend all the way through the sidewall of the U-shaped bend 38. The groove 158 may have any number of partially extending sections 160 and any number of fully extending sections 162. In the embodiment shown in FIGS. 2, 3, 12, and 13, the groove 158 is circular and includes two fully extending sections 162 having a curved shape.

A cover 164 for covering the waste arm 20 is shown in FIGS. 14-17. Corresponding features of this waste arm cover 164 are given the same reference numerals as described above with respect to the P-trap cover 32. The shape of the cover 164 substantially corresponds to the shape of the waste arm 20 having a generally cylindrical leg 166 attached to a U-shaped bend 168. A longitudinal slit 40 extends from the top 169 of the leg 166 down its sidewall and around the inside portion of the U-shaped bend 168.

The interior of the leg 166 may include inwardly extending flanges 41. The flanges 41 may take any suitable size shape and number as long as they act as a spacer between the cover 164 and the pipe.

An outwardly extending flange 46 is located on each edge of the slit 40 along the length of the leg 166. A plurality of protrusions 48 extend outwardly from the outer surface 50 of each flange 48. The protrusions 48 are spaced apart from one another, and each protrusion 48 on one flange 46 is aligned with a protrusion 48 on the other flange 46.

Figure 17:
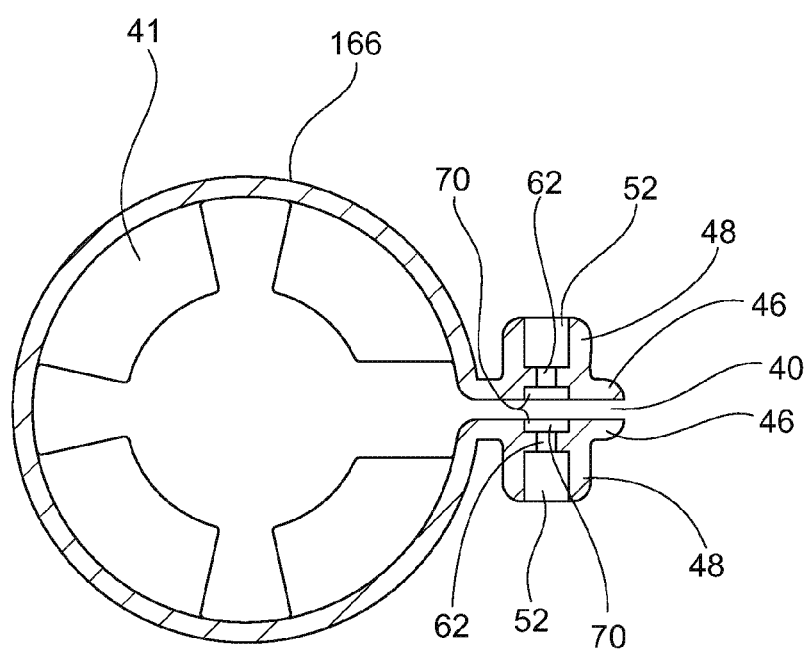
FIG. 17 is a cross-section view along line XVII-XVII in FIG. 15.
Figure 18:
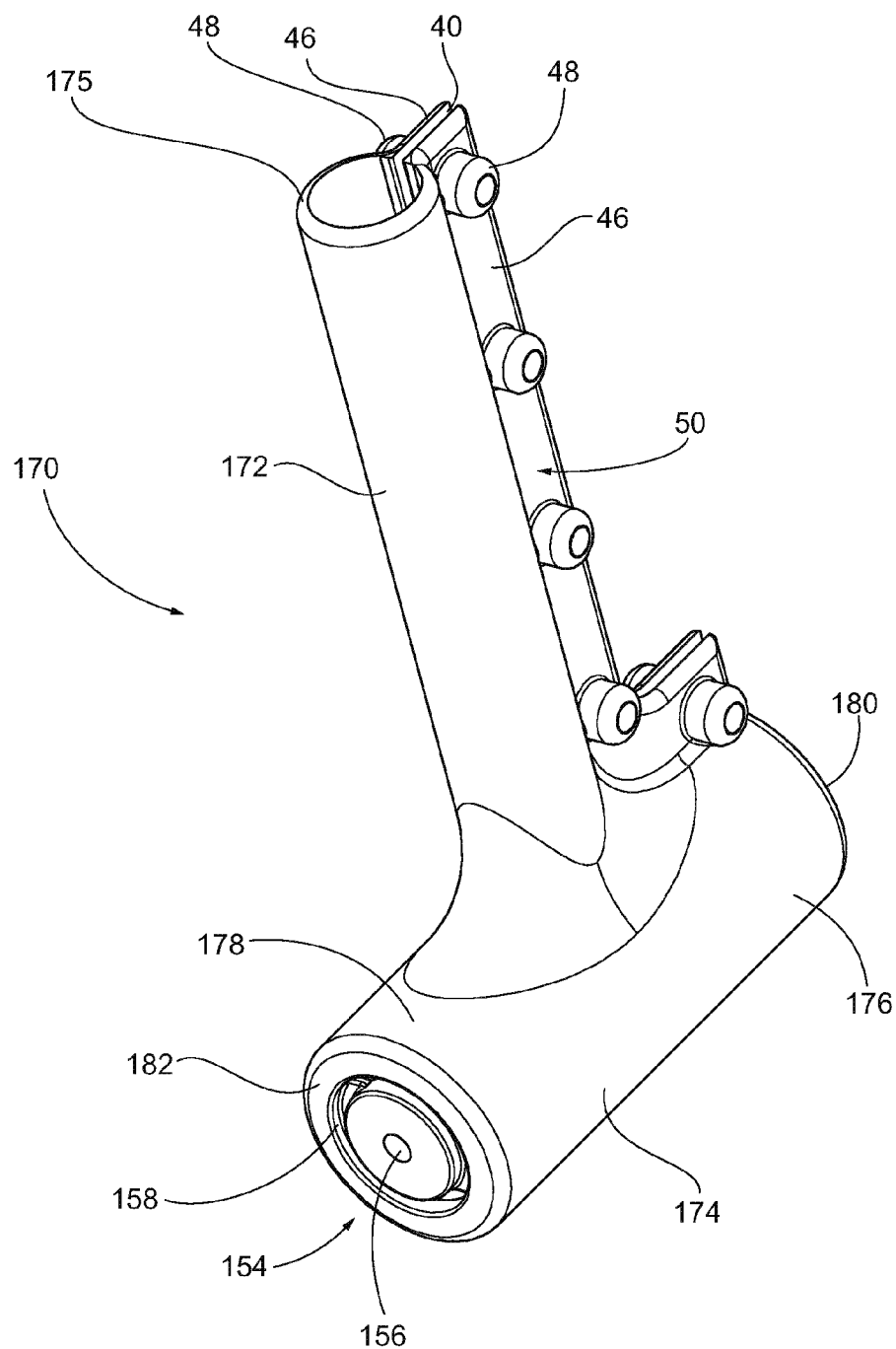
FIG. 18 is a side perspective view of a third embodiment of a pipe cover according to the present invention.
Figure 19:
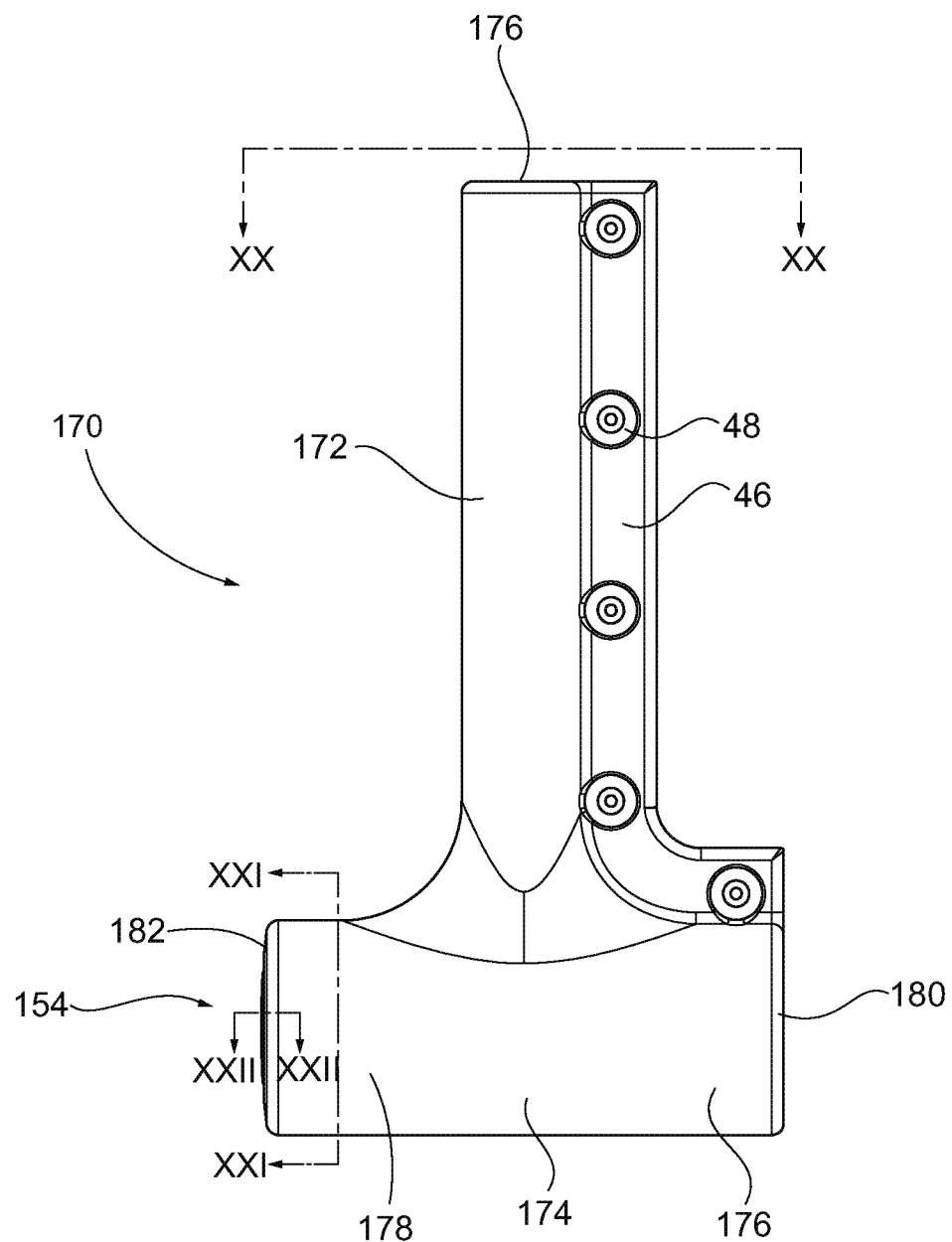
FIG. 19 is a side elevation view of the pipe cover of FIG. 18.
Figure 21:
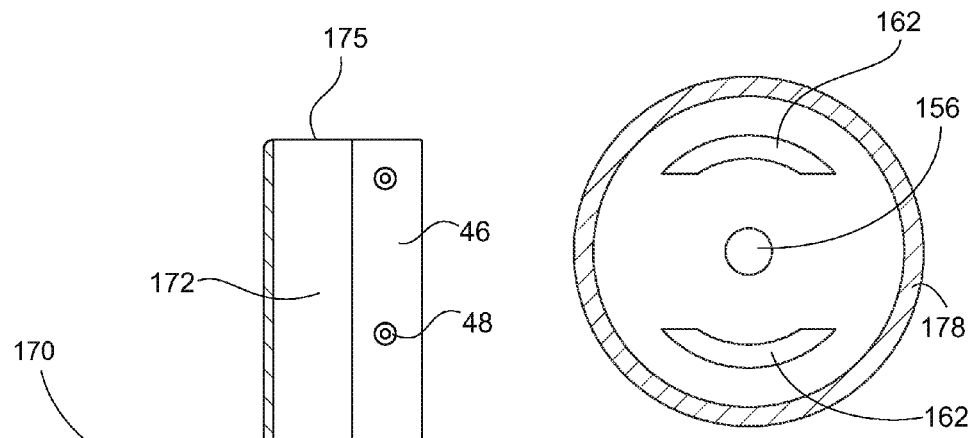
FIG. 21 is a cross-section view along line XXI-XXI in FIG. 19.
Figure 20:
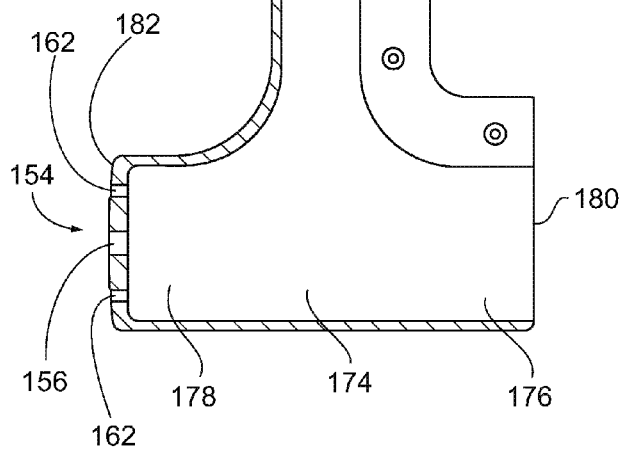
FIG. 20 is a cross-section view along line XX-XX in FIG. 19.
Figure 22:
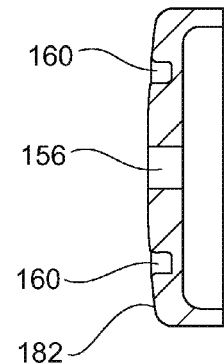
FIG. 22 is a cross-section view along line XXII-XXII in FIG. 19.

As shown in FIG. 17, each protrusion 48 has a first central opening 52, a second central opening 62, and a third central opening 70 as described above. The flanges 46 are attached to one another using the fastener 76 as described above.

A cover 170 for covering a supply pipe 28 and its shut-off valve 30 is shown in FIGS. 18-22. Corresponding features of this supply pipe cover 170 are given the same reference numerals as described above with respect to the P-trap cover 32. The cover 170 has a T-shape including a longitudinal, substantially cylindrical leg 172 and a transverse, substantially cylindrical leg 174 that substantially correspond to the shape of the supply pipe 28 including the shut-off valve 30. The transverse leg 174 has a first arm 176 and a second arm 178 that extend in opposite directions from the longitudinal leg 172. The end 180 of the first arm 176 is open and the end 182 of the second arm 178 is substantially closed. A longitudinal slit 40 extends from the top 175 of the longitudinal leg 172, down its sidewall, and across the first arm 176 of the transverse leg 174.

An outwardly extending flange 46 is located on each edge of the slit 40 along the entire length of the slit 40. A plurality of protrusions 48 extend outwardly from the outer surface 50 of each flange 46. The protrusions 48 are spaced apart from one another, and each protrusion 48 on one flange 46 is aligned with a protrusion 48 on the other flange 46.

Each protrusion 48 has a first central opening 52, a second central opening 62, and a third central opening 70 as described above. The flanges 46 are attached to one another using the fastener 76 as described above.

As shown in FIGS. 18-22, the cover 170 includes a drain 154 in the end 180 of the second arm 178 of the transverse leg 174 to allow condensate to drain from the cover 170. The drain 154 includes a central drain hole 156 surrounded by a groove 158 as described above.

Figure 23:
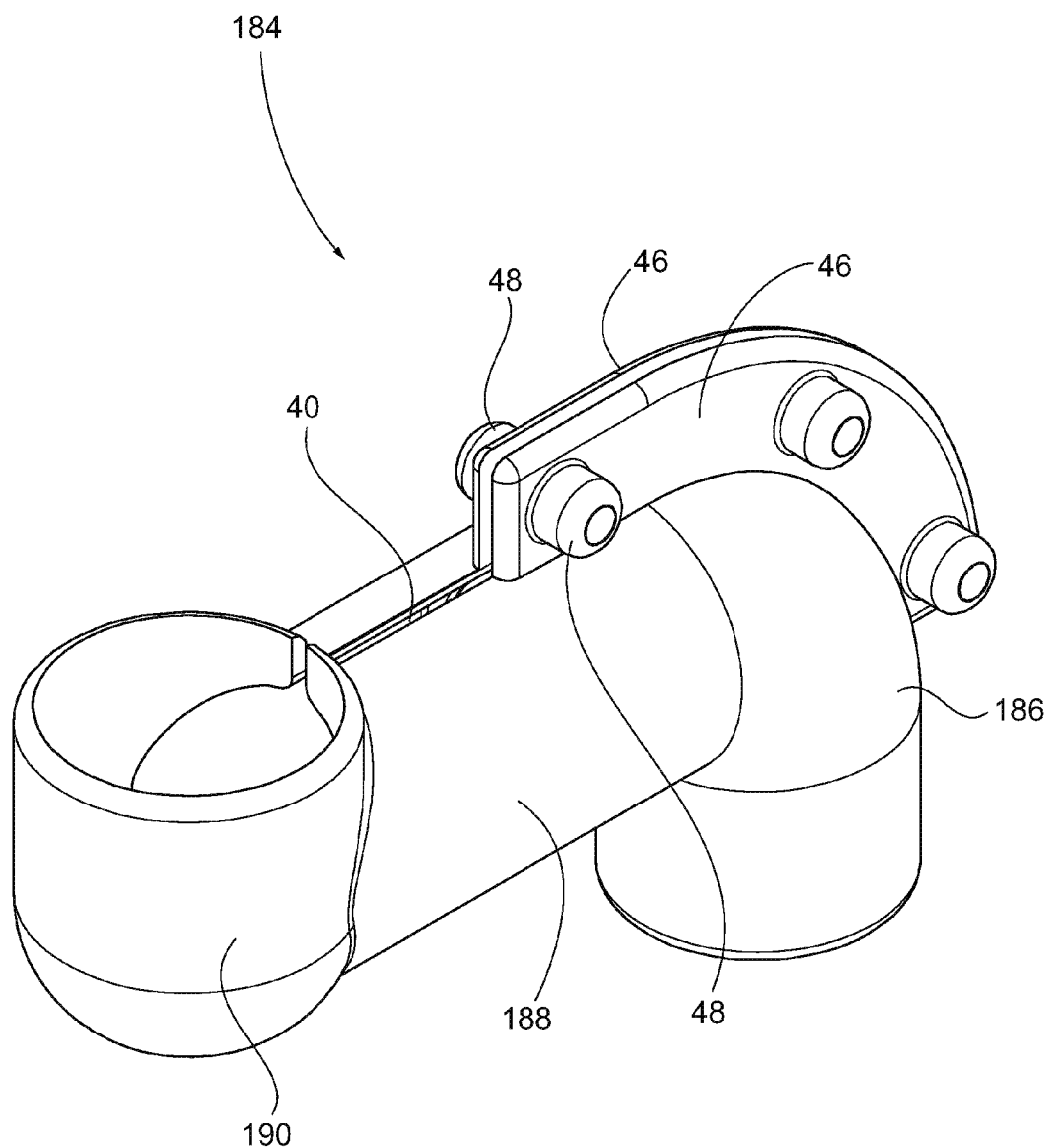
FIG. 23 is a side perspective view of a fourth embodiment of a pipe cover according to the present invention.
Figure 24:
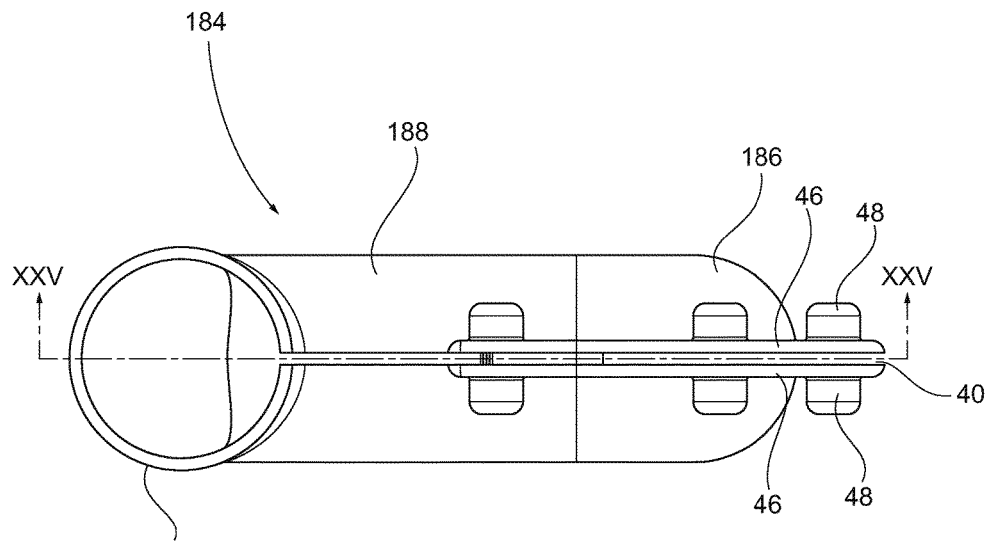
FIG. 24 is a top elevation view of the pipe cover of FIG. 2.
Figure 25:
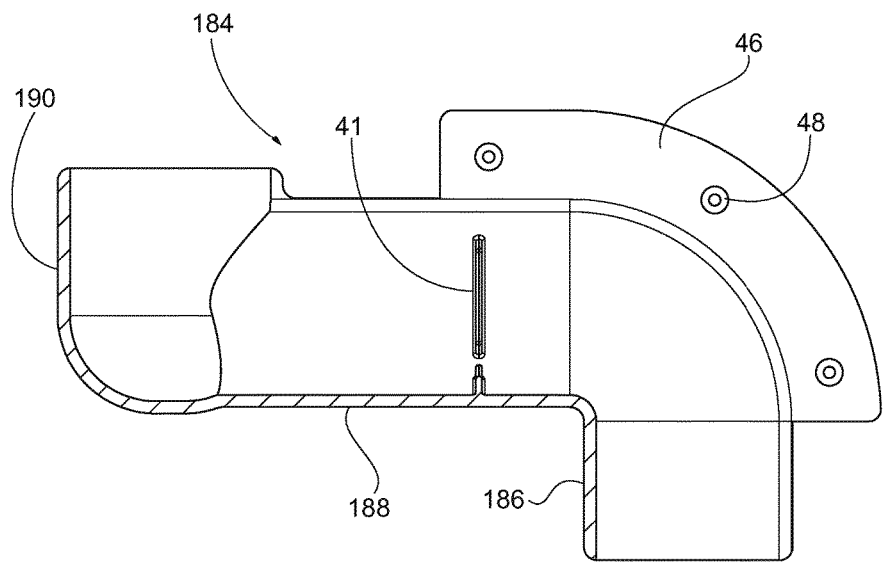
FIG. 25 is a cross-section view along line XXV-XXV in FIG. 24.

A cover 184 for covering an offset drain is shown in FIGS. 23-25. Corresponding features of this offset drain cover 184 are given the same reference numerals as described above with respect to the P-trap cover 32. The shape of the cover 184 substantially corresponds to the shape of an offset drain having a first right angle portion 186 and a second right angle portion 190 with a generally longitudinal cylindrical leg 188 extending therebetween. The first right angle portion 186 and the second right angle portion 190 face in opposing directions. A longitudinal slit 40 extends along the first right angle portion 186, along the cylindrical leg 188, and along the second right angle portion 190.

The interior of the leg 188 may include inwardly extending flanges 41. The flanges 41 may take any suitable size shape and number as long as they act as a spacer between the cover 184 and the pipe.

An outwardly extending flange 46 is located on each edge of the slit 40 along the curved section of the first right angle portion 186 and partially along the leg 188. A plurality of protrusions 48 extend outwardly from the outer surface 50 of each flange 48. The protrusions 48 are spaced apart from one another, and each protrusion 48 on one flange 46 is aligned with a protrusion 48 on the other flange 46.

Each protrusion 48 has a first central opening 52, a second central opening 62, and a third central opening 70 as described above. The flanges 46 are attached to one another using the fastener 76 as described above.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A cover for a pipe comprising:
   a body having a shape that substantially corresponds to the shape of at least a portion of the pipe to be covered;
   a longitudinal slit extending along at least a portion of the body;
   a first flange extending outwardly from a first edge of the slit and a second flange extending outwardly from a second edge of the slit; and
   a plurality of protrusions extending outwardly from an outer surface of each flange, each protrusion comprising:
      a first central opening having a first open end and a second open end;
      a second central opening having a first open end and a second open end; and
      a third central opening having a first open end and a second open ends of each third central opening are selectively mated when the first flange and the second flange are mated, wherein the second open ends of each third central opening that are mated to one another are a maximum diameter or width of the respective third central openings as viewed in cross-section in a plane perpendicular to a central longitudinal axis of the protrusion;

wherein the first open end of the first central opening is at an outermost end of the protrusion, the second open end of the first central opening is connected to the first open end of the second central opening, the second open end of the second central opening is connected to the first open end of the third central opening, and the second open end of the third central opening is located on an inner surface of the flange;

wherein a maximum diameter or width of the first central opening as viewed in cross-section in a plane perpendicular to the central longitudinal axis of the protrusion and the maximum diameter or width of the third central opening are larger than a maximum diameter or width of the second central opening as viewed in cross-section in a plane perpendicular to the central longitudinal axis of the protrusion.

2. The cover of claim 1, wherein each protrusion on the first flange is aligned with a protrusion on the second flange such that, when the first flange and the second flange are brought together, the third central openings of the protrusions align to form a single cavity.

3. The cover of claim 1, wherein the second central opening extends through an innermost end of the protrusion and into the flange.

4. The cover of claim 1, wherein the third central opening extends through the flange.

5. The cover of claim 1, wherein the maximum diameter or width of the first central opening as viewed in cross-section in a plane perpendicular to the central longitudinal axis of the protrusion is equal to the maximum diameter or width of the third central opening as viewed in cross-section in a plane perpendicular to the central longitudinal axis of the protrusion.

6. The cover of claim 1, wherein at least the second central opening is deformable.

7. The cover of claim 1, wherein a cross-section of at least one of the first central opening, the second central opening, and the third central opening is a circle or a square.

8. A system for covering a pipe comprising a cover and a plurality of fasteners, wherein the cover comprises:
 a body having a shape that substantially corresponds to the shape of at least a portion of the pipe to be covered;
 a longitudinal slit extending along at least a portion of the body;
 a first flange extending outwardly from a first edge of the slit and a second flange extending outwardly from a second edge of the slit; and
 a plurality of protrusions extending outwardly from an outer surface of each flange, each protrusion comprising:
  a first central opening having a first open end and a second open end;
  a second central opening having a first open end and a second open end; and
  a third central opening having a first open end and a second open end, the second open ends of each third central opening are selectively mated when the first flange and the second flange are mated, wherein the second open ends of each third central opening that are mated to one another are a maximum diameter or width of the respective third central openings as viewed in cross-section in a plane perpendicular to a central longitudinal axis of the protrusion;

wherein the first open end of the first central opening is at an outermost end of the protrusion, the second open end of the first central opening is connected to the first open end of the second central opening, the second open end of the second central opening is connected to the first open end of the third central opening, and the second open end of the third central opening is located on an inner surface of the flange, wherein a maximum diameter or width of the first central opening as viewed in cross-section in a plane perpendicular to the central longitudinal axis of the protrusion and the maximum diameter or width of the third central opening are larger than a maximum diameter or width of the second central opening as viewed in cross-section in a plane perpendicular to the central longitudinal axis of the protrusion;

wherein at least one of the plurality of fasteners comprises:
 a first portion having a first end, a second end, and a sidewall extending therebetween;
 a second portion having a first end, a second end, and a sidewall extending therebetween, the first end of the second portion connected to the second end of the first portion;
 a third portion having a first end and a second end, the first end of the third portion connected to the second end of the second portion;
 a fourth portion having a first end, a second end, and a sidewall extending therebetween, the first end of the fourth portion connected to the second end of the third portion; and
 a fifth portion having a first end and a second end, the first end of the fifth portion connected to the second end of the fourth portion, and wherein when the system is connected around the pipe the first portion of the at least one fastener is received in one of the first central openings of the first flange, the second portion of the at least one fastener is received in a respective one of the second central openings of the first flange, the third portion of the at least one fastener is received in a respective one of the third central openings of the first flange and a respective one of the third central openings of the second flange, the fourth portion of the at least one fastener is received in a respective one of the second central openings of the second flange, and the fifth portion of the at least one fastener is received in a respective one of the first central openings of the second flange such that the at least one fastener holds the first flange and second flange together closing the slit.

9. The system of claim 8, wherein a maximum width or diameter of the first portion, the third portion, and the fifth portion of the fastener as viewed in cross-section in a plane perpendicular to a central longitudinal axis of the fastener is larger than a maximum width or diameter of the second portion and the fourth portion of the fastener as viewed in cross-section in a plane perpendicular to the central longitudinal axis of the fastener.

* * * * *